United States Patent Office.

ERNST ZÜHL, OF BERLIN, GERMANY.

PYROXYLIN COMPOUND.

SPECIFICATION forming part of Letters Patent No. 700,885, dated May 27, 1902.

Application filed July 2, 1901. Serial No. 66,913. (No specimens.)

*To all whom it may concern:*

Be it known that I, ERNST ZÜHL, chemist, a subject of the King of Prussia, German Emperor, and a resident of Berlin, in the Kingdom of Prussia, German Empire, have invented certain new and useful Improvements in Celluloid or Pyroxylin Compounds and Processes of Making Same, of which the following is a specification.

My invention has reference to an artificial substance which is employed in the arts and trades for the same purposes as celluloid, pyralin, and similar compositions. The commercially-successful compositions of this kind consist, essentially, of nitrocellulose and camphor, the latter of which is very expensive. In order to produce a cheap composition of this kind, it is necessary to reduce the quantity of camphor employed in the manufacture of celluloid or similar compositions, or preferably to dispense entirely with same.

It is the special object of my invention to produce a cheap composition of this kind in which the use of camphor is preferably entirely dispensed with. My new composition, further, possesses additional advantages, as will be fully described farther down.

I have discovered that the esters or compound ethers of the inorganic acids and the oxygenated hydrocarbons of the aromatic compounds are a valuable and effective substitute for camphor in celluloid-like compositions, and of these particularly the esters of phosphoric acid with the monoöxygenated hydrocarbons of the aromatic series.

My novel material is composed, essentially, of nitrated cellulose and the phosphoric-acid esters of the monoöxygenated hydrocarbons of the aromatic series or ring type, in which one atom of hydrogen is replaced by the hydroxyl group, and I prefer to use triphenylphosphate, tricresylphosphate, and trinaphthylphosphate as a substitute for camphor in my novel composition.

The esters of inorganic acids of the monoöxygenated hydrocarbons present various marked advantages as compared with substitutes for camphor which are composed entirely of organic matter. The esters of the inorganic acids in a celluloid composition retard considerably the combustion of the mass or articles made therefrom. The ready goods of this composition are odorless. They do not decompose, and they retain their color.

In manufacturing the solid material I substantially proceed as follows: The nitrocellulose is preferably treated with an auxiliary solvent; but this is not indispensably necessary. Then the phosphoric-acid esters of the monoöxygenated hydrocarbons of the aromatic series are mixed therewith and the resulting mixture manipulated according to the well-known methods employed in the manufacture of celluloid, so that the solid material is obtained.

For many purposes I prefer to use the following formulas:

1. Fifty kilograms of triphenylphosphate, $PO(OC_6H_5)_3$, is mixed with one hundred and twenty kilograms of nitrocellulose, with or without the aid of an auxiliary solvent, and the resulting mixture worked up in the usual manner.

2. Fifty kilograms of tricresylphosphate, $PO(OC_7H_7)_3$, is mixed with one hundred and twenty-five kilograms of nitrocellulose, with or without the aid of an auxiliary solvent, and the resulting mixture worked up as usual.

3. Twenty-five kilograms of trinaphthylphosphate, $PO(OC_{10}H_7)_3$, is mixed with seventy-five kilograms of nitrocellulose and then worked up according to well-known methods.

These proportions may be varied, however, within reasonable limits.

The use of inorganic esters in the manufacture of celluloid or similar compositions not only cheapens the final product, but the material, as well as the finished articles, possess the above-defined marked advantages.

Having thus described my invention, I claim as new and desire to secure by Letters Patent of the United States—

1. The process of manufacturing pyroxylin compounds which consists in combining nitrated cellulose with one or more members of the compound esters of phosphoric acid and monoöxygenated hydrocarbons of the aromatic series (consisting essentially of triphenylphosphate, tricresylphosphate and trinaphthylphosphate,) as described.

2. The process of manufacturing pyroxylin compounds which consists in combining nitrated cellulose with one or more members of the compound esters of phosphoric acid and monoöxygenated hydrocarbons of the aromatic series (consisting essentially of triphenylphosphate, tricresylphosphate and trinaphthylphosphate,) and working the resulting mixture up into the material, as specified.

3. The process of manufacturing pyroxylin compounds which consists in combining nitrated cellulose with one or more members of the compound esters of phosphoric acid and monoöxygenated hydrocarbons of the aromatic series (consisting essentially of triphenylphosphate, tricresylphosphate and trinaphthylphosphate,) and an auxiliary solvent, as specified.

4. As a new article of manufacture a solid composition to be used as a material in the arts and trades and composed essentially of nitrated cellulose, and one or more members of the compound esters of phosphoric acid and monoöxygenated hydrocarbons of the aromatic series (consisting essentially of triphenylphosphate, tricresylphosphate and trinaphthylphosphate,) as specified.

5. As a new article of manufacture, a solid composition to be used as a material in the arts and trades and composed essentially of nitrated cellulose, and one or more members of the compound esters of phosphoric acid and monoöxygenated hydrocarbons of the aromatic series (consisting essentially of triphenylphosphate, tricresylphosphate and trinaphthylphosphate,) substantially as described and in the proportions specified.

6. As a new article of manufacture, a solid composition to be used as a material in the arts and trades and composed essentially of nitrated cellulose, and one or more members of the compound esters of phosphoric acid and monoöxygenated hydrocarbons of the aromatic series (consisting essentially of triphenylphosphate, tricresylphosphate and trinaphthylphosphate,) and an auxiliary solvent, as specified.

Signed by me at Berlin, this 13th day of June, 1901.

ERNST ZÜHL.

Witnesses:
  HENRY HASPER,
  WOLDEMAR HAUPT.